United States Patent Office 3,784,649
Patented Jan. 8, 1974

3,784,649
HIGH MOLECULAR WEIGHT IONENE POLYMERIC COMPOSITIONS
Stanley J. Buckman, John D. Pera, Fred W. Raths, and Gerald D. Mercer, Memphis, Tenn., assignors to Buckman Laboratories, Inc., Memphis, Tenn.
No Drawing. Filed Mar. 30, 1971, Ser. No. 129,593
Int. Cl. C08f 3/24, 29/34
U.S. Cl. 260—874
31 Claims

ABSTRACT OF THE DISCLOSURE

High molecular weight ionene polymeric compositions are prepared by reacting a dihalo organic compound with a secondary or a ditertiary amine and then reacting the resultant product with a polymeric backbone composition and a coupling agent. The resulting polymers have utility in many diverse applications.

---

This invention relates to the art of polymeric compositions and, more particularly, to methods of preparing new and useful high molecular weight type polymeric compositions. The term "ionene type polymeric compositions" is used herein to identify polymers containing ionic amine groups, specifically quaternary ammonium groups. A. Rembaum et al. [Polymer Letters, 6, 159–171 (1968)] first suggested that these types of polymers be so identified and this definition has been accepted subsequently by other authors in this field including the editors of Chemical Abstracts.

Although ionene type polymers are very versatile materials exhibiting utility in such widely divergent applications as anticoagulant drugs, microbicides, cationizing agents for starches and gums, draining aids, formation aids, retention aids, strength aids, and flocculants, their use in industrial processes has been limited. Other polymers such as polyacrylamides, polyethylenimines, and various copolymers of these latter two polymers have been used much more extensively in industry, particularly for retention, drainage, formation, and strength aids in the manufacture of pulp and paper and as flocculants for use in making more efficient liquid-solid separations in the processing of industrial and municipal effluents. The foregoing apparently is true because these other polymers while less versatile are much more effective in a few applications than the ionene type polymers. As a result of our research efforts, we have concluded that these other polymers are more effective chiefly because their molecular weight is much higher than that of the ionene type polymers. Specifically, the molecular weights of the latter polymers are below 50,000 and for the most part vary from about 5,000 to 20,000.

It is, therefore, a principal object of the present invention to provide an ionene type polymer that obviates the disadvantages of the prior art compositions of this type.

It is another object of our invention to provide a process whereby ionene type polymers of almost any desired molecular weight can be produced.

These and other objects and advantages will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

As one embodiment of our invention, ionene polymeric compositions of almost any desired molecular weight can be produced by varying the molecular size of each of the various components used in the process. In this respect, the molecular size of the polymeric backbone composition is probably the most important. In another aspect of this invention, ionene polymeric compositions can be produced with other functional groups on the same polymeric backbone. As one example, some free pendant carboxylic acid groups can be allowed to remain on the polymeric backbone to function along with the ionene polymers attached to the same structure. In addition, the polymeric backbone may contain other groups such as acrylamides, primary or secondary alkyleneimines, etc. Such groups can be varied to provide the most desirable combination to use along with the ionene type polymers to meet the requirements of different applications most effectively. Moreover, it is possible to build high molecular weight polymers with high solubility in water, which eliminates the cost and inconvenience of preparing solutions from dry powder products or the excessive transportation charges involved in shipping solutions of low concentrations.

Before proceeding with specific examples illustrating our invention, it may be well to indicate in general the type of materials useful in the invention.

As pointed out above, the ionene type polymer is prepared by reacting a dihalo organic compound with a secondary or a ditertiary amine. These polymerization processes plus suitable reactants have been described by D. M. Ritter in U.S. Pat. 2,261,002; N. E. Searle in U.S. Pat. 2,271,378; and J. W. Bayer et al. in U.S. Pat. 3,489,663, which disclosures are hereby made a part of this application.

In addition to the dihalo organic compounds disclosed in the foregoing references, other suitable dihalo compounds are those having the formula:

$$X-(Y)_m-Z-(Y)_n-X$$

wherein X represents Br or Cl; Y represents a $CH_2$ group and/or a substituted $CH_2$ group wherein one of the hydrogens thereof is replaced by alkyl or hydroxymethyl; and $m$ and $n$ independently represent integers varying from 1 to 10. Z represents

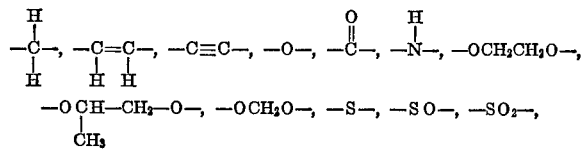

and arylene. When Y represents a substituted $CH_2$ group or represents both unsubstituted and substituted $CH_2$ groups, the total number of substituted $CH_2$ groups may not exceed 3.

Examples of suitable dihalo organic compounds include the following specific dichloro compounds plus the corresponding dibromo compounds:

bis(chloromethyl) ether,
bis(2-chloroethyl) ether,
bis(2-chloropropyl) ether,
bis(4-chlorobutyl) ether,
oxy-3,3-bis(2-chloropropanol-1),
bis(2-chloromethyl) sulfide,
bis(2-chloroethyl) sulfoxide,
bis(2-chloromethyl) sulfone,
bis(3-chloropropyl) sulfide,
bis(2-chloropropyl) sulfone,
bis(2-chloroethoxy)ethane,
1,2-bis(chloromethoxy)ethane,
1,2-bis(2-chloroethoxy)propane,
1,2-bis(2-chloropropoxy)propane,
1,3-dichloropropane and other alpha,omega-dichloroalkanes, 1,4-dichloro-2-butene,
1,4-dichloro-2-butyne,
1,3-dichloropropanol-2,
bis(chloromethyl) benzenes,
bis(chloromethyl) toluenes,
bis(chloromethyl) xylenes, and
bis(chloromethylphenyl) oxides, Suitable secondary and ditertiary amines include:

N,N,N',N'-tetramethylethylenediamine,
N,N,N',N'-tetraethylethylenediamine,
N,N,N',N'-tetramethyl-1,3-butanediamine,
N,N,N',N'-tetraethyl-1,3-butanediamine,
N,N,N',N'-tetramethyl-1,4-butanediamine,
N,N,N',N'-tetraethyl-1,4-butanediamine,
N,N'-dimethylpiperazine,
N,N'-diethylpiperazine,
1,4-diazabicyclo(2,2,2)octane,
4,4'-bipyridyl,
N,N,N',N'-tetramethylbenzidine,
N,N,N',N'-tetraethylbenzidine,
oxy-bis-2,2(N,N-dimethylethylamine),
4,4'-bis(dimethylamino)benzophenone,
p,p'-methylenebis(N,N'-dimethylaniline),
N,N,N',N'-tetrakis(hydroxyethyl)ethylenediamine,
N,N,N',N'-tetrakis(2-hydroxypropyl)ethylenediamine,
N,N,N',N'-tetramethyl-2-butenediamine,
N,N,N',N'-tetramethyl-1,6-hexanediamine,
bis(dimethylaminomethyl) benzenes,
bis(dimethylaminomethyl) toluenes,
bis(dimethylaminomethyl) xylenes,
dimethylamine,
diethylamine,
diisopropylamine,
dibutylamine,
diethanolamine,
diisopropanolamine,
piperidine,
morpholine,
2,6-dimethylmorpholine,
1,2,4-trimethylpiperazine, and
1,4-bis(2-hydroxypropyl)-2-methylpiperazine.

Although, as indicated above, either a secondary or a ditertiary amine may be used in the process, we generally prefer to use a ditertiary amine as the dihalo organic compounds react directly with such amines to form a polyquaternary product. If a secondary amine is used, the dihalo compound reacts with the amine to form a ditertiary amine salt which upon neutralization undergoes polymerization with an additional quantity of the dihalo compound. The reaction between the dihalo compound and the amine is conducted in the presence of an inert solvent. Water is the preferred solvent. A suitable reaction temperature varies from 50–150° C.

As to the relative amounts of the two components used in preparing the ionene polymer, suitable quantities of the dihalo organic compound on a molar basis vary from 0.75 to 1.0 and preferred quantities vary from 0.95 to 1.0 per mole of the amine.

Suitable polymeric backbone compositions are those containing reactive groups such as carboxyl and alkali-metal salts thereof, primary and secondary amino, imino, hydroxy, phenolic and alkali-metal salts thereof. These backbone compositions are well known to those skilled in the art and can be easily prepared from organic acids such as acrylic, methacrylic and maleic. Other organic compounds that can be used in the preparation of these backbones include maleic anhydride and dimer and trimer acids derived from long chain fatty acids.

Specific compounds useful as backbones in our invention include: polyacrylic and polymethacrylic acids and the sodium salts thereof, maleic anhydride-styrene copolymer, polyalkyleneamines, polyethylenimine, polyvinyl alcohol, carboxymethyl cellulose, polyhydroxymethyl-acrylamide, and copolymers of acrylic and methacrylic acids with acrylamide.

Suitable coupling agents are bifunctional compounds wherein one of the functional groups thereof is capable of reacting with a tertiary amine and the other functional group is capable of reacting with an active group of the backbone composition. Specific compounds useful as coupling agents in our invention include: epichlorohydrin, epibromohydrin, 1-chloro-2,3-epithiopropane, 1,4-dichloro-2-butene, 1,3-dichloro-2-propanol, dichloroethyl ether, ethylene dichloride and ethylene dibromide.

The solvent used in these reactions is preferably water but polar organic solvents such as alcohols, ketones, dimethylformamide, etc., may also be used. The reaction temperatures are generally between 50 and 100° C., but higher or lower temperatures may be employed in some of the reactions.

The ionene polymeric compositions, which are sometimes designated copolymers, according to the invention are useful as drainage aids, formation aids, retention aids, and as strength improving agents for paper and paperboard. These compositions are also useful as flocculants in the clarification of incoming water supplies and industrial and municipal effluents. In particular, the new compositions may be used in recovery of the valuable materials remaining in the process waters of paper and pulp manufacture, thereby also alleviating the pollution problems of the industry.

The ionene polymeric compositions according to the invention can also be used to remove any solid particulate matter remaining in the water before it is discharged, even though such matter is not of a character suitable for use but must be disposed of by microbiological decomposition or combustion, or buried in a sanitary fill.

The ionene polymeric compositions according to the invention are also useful in the treatment of incoming water supplies. These new compositions are fast-acting flocculants, compatible with alum. Hence they may be used in the treatment of incoming water supplies as a supplement to low cost alum, thus achieving a reduction in process time in addition to the desired degree of completeness in the removal of finely divided solids. Similar principles apply to the removal of particulate solid matter from water discharged as industrial or municipal effluents.

The ionene polymeric compositions are also useful in applications such as corrosion inhibitors, detergents, wetting agents, spinning aids, and antistatic agents for textile fibers and plastics; manufacture of electroconductive paper for office copy, computer printout, and data retrieval systems; as broad spectrum microbicides which provide efficient control of bacteria including sulfate reducers, fungi, algae, and yeast; accelerators for curing various plastics, liquid-solid separations in gas scrubber water from steel blast furnaces, and the separation of tailings and fines from minerals in ore processing; and in the manufacture of ion exchange resins.

According to a still further feature of the invention, there is provided a method of flocculating solids from an aqueous system which comprises adding to the aqueous system one or more of the ionene polymeric compositions as hereinbefore described in an amount sufficient to cause flocculation of the solids.

In the use of the water-soluble copolymers of the invention as flocculants, one or more may be added to a given aqueous suspension with sufficient agitation to insure uniform distribution. Following this treatment, the flocculated aggregates will settle. The amount of the water-soluble copolymers according to the invention necessary to produce the desired result is highly variable depending on the amount and nature of the particulate matter on which an effect is needed as well as the other components of the ionic environment in which the copolymers and particulate matter are present. Suitable quantities of the copolymers of this invention may vary from as low as 0.1 part per million based on the total weight of water and particulate matter to as high as 25 parts per million on the same basis with a preferred range from 0.5 to 5 parts per million.

The ionene polymeric compositions of the invention may be added to papermaking systems producing various types of paper and paperboard with beneficial results.

According to yet a further feature of the invention, there is provided a process for the preparation of paper or paperboard wherein an aqueous fluid containing cellulosic pulp and other papermaking ingredients is formed into a sheet on a fourdrinier wire cloth, one or more of the copolymers of this invention being added to the aqueous fluid before the furnish contacts the fourdrinier wire cloth.

When the ionene polymeric compositions of the invention are used as papermaking aids, one or more of them may, for example, be added continuously to the paper machine system at suitable locations such as at the machine chest, the fan pump, or the headbox. The desirable results obtained by using this process may be summarized as follows:

(1) Increased production per unit of equipment.
(2) Improved formation and strength properties of paper and paperboard.
(3) Increase in overall mill efficiency in that losses of fines such as fine fibers, pigments, fillers, and other paper components are minimized by increasing retention of these products in paper and paperboard.
(4) Alleviation of water pollution problems.

In order to disclose the nature of the invention still more clearly, the following illustrative examples will be given. It is understood, however, that the invention is not to be limited to the specific conditions or details set forth in these examples, except insofar as such limitations are specified in the appended claims.

EXAMPLE 1

A 100-gallon glass-lined, jacketed reactor was charged with 301 pounds of an aqueous solution containing 74.11 percent of N,N,N',N'-tetramethylethylenediamine (1.92 pound moles), 261 pounds of dichloroethyl ether (1.82 pound moles) and 206 pounds of water. The mixture was heated to 80° C. and an exothermic reaction occurred. Steam was removed from the jacket as the temperature rose to 84° C. Refluxing occurred and the temperature rose in one hour to 97° C. Steam was injected into the jacket to maintain the contents at reflux temperature for 5 hours. The reaction was then cooled, a sample withdrawn, and analyzed for tertiary amine content which was determined to be 0.495 milliequivalents per gram.

The same reactor was charged with 580 pounds of this ionene polymer and 26.1 pounds of epichlorohydrin and the mixture was heated at 60° C. for 1.75 hours. An analysis for epoxide at this stage indicated that 63 percent of the theoretical amount of epoxide was present. The contents were then heated to 80° C. and a solution containing 20.6 pounds of polyacrylic acid and 178.2 pounds of water was added to the reactor. (The polyacrylic acid solution had a viscosity of 22–28 centipoises at 25° C. as a 22 percent aqueous solution.) The contents were then heated to between 90 and 100° C. for one hour and then cooled. The final product contained 1.10 percent of carboxylic acid groups calculated as acrylic acid. The product was effective as a flocculant and as a retention aid.

EXAMPLE 2

A glass reaction flask was charged with 250 grams of the ionene polymer described in Example 1 and 12.0 grams of epichlorohydrin and the mixture heated at 55° C. for two hours. The contents of the flask were heated to 80° C. and a solution of 5.3 grams of polyethylenimine in 81 grams of hot water was added over a 10- to 15-minute period while the temperature was maintained between 75 and 80° C. The reaction was then heated to about 85° C. and a gel was obtained. This gel was slowly soluble in water and was effective as a flocculant.

EXAMPLE 3

A similar reaction product of 250 grams of ionene polymer from Example 1 and 12.0 grams of epichlorohydrin was reacted with a solution of 19 grams tetraethylenepentamine in 95 grams of water at 90–95° C. for 0.5 hour. The product was a clear viscous solution which was an effective flocculant.

EXAMPLE 4

A similar reaction product of 150 grams of ionene polymer from Example 1 and 6.9 grams of epichlorohydrin was reacted with a solution of 3.0 grams of carboxymethyl cellulose in 100 grams of water at 95° C. for 0.5 hour. The product was a clear viscous solution which was an effective flocculant.

EXAMPLE 5

A second ionene polymer similar to that described in Example 1 was prepared from N,N,N',N'-tetramethylethylenediamine and dichloroethyl ether. The total amine content of the finished product was 0.577 milliequivalent per gram of ionene polymer solution. One thousand grams of this ionene polymer was reacted with 53.5 grams of epichlorohydrin at 60° C. for two hours. A portion of the epoxidized ionene (526 grams) was then mixed with 297 grams of a polyhydroxymethylacrylamide solution at 80° C. and further reacted at 95° C. for one hour. The product was a clear viscous solution which was an effective flocculant.

The polyhydroxymethylacrylamide solution used in this example was prepared by reacting overnight at room temperature a low molecular weight polyacrylamide with formaldehyde in an aqueous solution adjusted to pH 10 with trisodium phosphate.

EXAMPLE 6

The reaction product of the ionene polymer and epichlorohydrin described in Example 1 (100 grams) was treated with 0.5 gram of $H_2SO_4$ and then mixed with a solution of 2.5 grams of polyvinyl alcohol (molecular weight 31,500) in 45.8 grams of water and with 188.5 grams of water at 80° C. The reaction was then heated at 95° C. for two hours. The final product after cooling contained a very small amount of water insoluble solid, but the liquid was a clear viscous solution.

A second reaction using polyvinyl alcohol (4–6 centipoises for a 4 percent aqueous solution at 20° C.) was run by reacting a solution of 20.0 grams of polyvinyl alcohol in 180 grams of water with 40.7 grams of epichlorohydrin using two drops of concentrated sulfuric acid as catalyst at 25° C. for 18 hours. Sixty-three grams of this reaction product was added to 200 grams of the ionene polymer described in Example 1 at 80° C. and the mixture was reacted at 95° C. for two hours. The product was a viscous solution containing a small amount of water insoluble solid. The solid was removed by filtration and a clear viscous filtrate was obtained.

Both products made from polyvinyl alcohol were effective as flocculants.

EXAMPLE 7

A glass reaction flask was charged with 166.3 grams (0.95 mole) of 1,4-bis(chloromethyl)benzene, 117.5 grams of 98.7 percent N,N,N',N'-tetramethylethylenediamine (1.0 mole) and 164.3 grams of water. An exothermic reaction occurred and the temperature rose to the reflux temperature of 105° C. After 10 minutes, heat was applied and the reaction was refluxed for an additional hour. The viscous reaction mixture was then cooled and analyzed for tertiary amine by titration. The total amine content was 0.934 milliequivalent per gram of product.

One hundred grams of this ionene polymer solution was reacted with 7.7 grams of 50 percent sodium hydroxide solution to neutralize some HCl which had formed in the preparation of the ionene polymer and then with 8.9 grams of epichlorohydrin for two hours at 60° C. The reaction was then heated to 80° C. and 31.5 grams of polyacrylic acid-water solution containing 22 percent of the polymer and 20 grams of water were added. The reaction mixture was heated at 90–95° C. for one hour. After cooling, the product contained a layer of thick gummy polymer.

EXAMPLE 8

A glass reaction flask was charged with 80 grams (0.50 mole) of 2,2'-dimethylaminoethyl ether, 67.9 grams (0.475 mole) of dichloroethyl ether and 86.9 grams of water. The mixture was heated at reflux for 3.5 hours. The viscous polymer solution contained 0.183 milliequivalent of total amine per gram of ionene polymer solution.

One hundred grams of this polymer solution was then heated with 2.0 grams of epichlorohydrin at 60° C. for two hours. This reaction product was then treated with 6 grams of a polyacrylic acid-water solution containing 1.3 grams of polyacrylic acid polymer and 24 grams of water at 80° C. and the mixture was heated at 90–95° C. for one hour. The product became more viscous during the heating period and was an effective flocculant.

EXAMPLE 9

A glass reaction flask was charged with 71 grams (0.50 mole) of N,N,N',N'-tetramethylbutene-2-diamine and 66.7 grams of water and 59.3 grams (0.475 mole) of 1,4-dichloro-2-butene was added dropwise in about 15 minutes. The temperature rose to 50° C. The reaction was then heated at reflux for three hours. The ionene polymer formed contained 0.444 milliequivalent of total amine per gram of ionene polymer solution.

One hundred grams of this polymer solution was heated with 4.1 grams of epichlorohydrin at 60° C. for two hours. This reaction product was then treated with 14.5 grams of a polyacrylic acid-water solution containing 3.1 grams of polyacrylic acid polymer and 22 grams of water at 80° C. and the mixture was then heated at 90–95° C. for one hour. The reaction product was a dark viscous solution which was an effective flocculant.

EXAMPLE 10

A glass reaction flask was charged with 100 grams (0.875 mole) of N,N'-dimethylpiperazine, 118.9 grams (0.83 mole) of dichloroethyl ether and 218.9 grams of water and the mixture was heated at reflux for 13 hours. The viscous solution contained 0.663 milliequivalent of total amine per gram of ionene polymer solution.

Two hundred grams of this ionene polymer was reacted with 12.3 grams of epichlorohydrin at 60° C. for two hours. The temperature was then increased to 80° C. and 43.6 grams of a water solution of polyacrylic acid containing 9.6 grams of polyacrylic acid polymer was added and the mixture heated at 95° C. for two hours. The final product was a slightly cloudy solution which was a flocculant.

EXAMPLE 11

A glass reaction flask was charged with 50 grams (0.290 mole) of N,N,N',N'-tetramethylhexanediamine, 35.1 grams (0.276 mole) of 1,4-dichlorobutane and 85.1 grams of water and the mixture was heated at reflux for five hours. The viscous solution contained 0.065 milliequivalent of total amine per gram of ionene polymer.

This ionene polymer (147.8 grams) was reacted with 0.89 gram of epichlorohydrin at 60° C. for two hours. The temperature was increased to 80° C. and 3.14 grams of a polyacrylic acid-water solution containing 0.69 gram of polyacrylic acid polymer was added. The mixture was then heated at 95° C. for two hours. The final product was cloudy and viscous and was an effective flocculant.

EXAMPLE 12

A glass reaction flask was charged with 50 grams (0.384 mole) of N,N,N',N'-tetramethylpropanediamine, 52.2 grams (0.365 mole) of dichloroethyl ether and 102.2 grams of water and the mixture was heated at reflux for five hours. The viscous solution contained 0.269 milliequivalent of total amine per gram of ionene polymer.

This ionene polymer (182.1 grams) was reacted with 4.6 grams of epichlorohydrin at 60° C. for two hours. The temperature was raised to 80° C. and 16.0 grams of a polyacrylic acid-water solution containing 3.53 grams of polyacrylic acid was added. The mixture was heated to 95° C. for two hours. The final product was a cloudy viscous solution and was an effective flocculant.

EXAMPLE 13

A glass reaction flask was charged with 200 grams of ionene polymer described in Example 5 and 37.9 grams of a polyacrylic acid-water solution (containing 8.3 grams of polyacrylic acid polymer) adjusted to pH 9 with sodium hydroxide. A solution was obtained and after 30 minutes, the solution was heated to 45–50° C. and treated with 14.4 grams of 1,4-dichloro-2-butene. The mixture was warmed for 30 minutes at 45–50° C. and then heated at 75–80° C. for one hour. The product was a uniform viscous polymer.

EXAMPLE 14

An ionene polymer similar to that described in Example 1 was prepared from N,N,N',N'-tetramethylethylenediamine and dichloroethyl ether. The total amine content of the finished product was 0.610 milliequivalent per gram of ionene polymer solution. This ionene polymer solution (189.3 grams) was reacted with 10.7 grams of epichlorohydrin at 60° C. for two hours. A copolymer was prepared by the partial hydrolysis of polyacrylonitrile (molecular weight at 25,000) and contained 22.8 percent of sodium polyacrylate and 7.2 percent of polyacrylamide. This copolymer solution (47.8 grams) was diluted with 40.8 grams of water and the pH was adjusted to 4 with hydrochloric acid to obtain the free polyacrylic acid from the sodium polyacrylate.

The ionene polymer-epichlorohydrin reaction was heated to 80° C. and the copolymer solution was added at such a rate to maintain the temperature at 80° C. The reaction mixture was then heated to 95° C. and after 5 minutes a soft gel was formed. The gel was slowly soluble in water and was an effective flocculant.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A high molecular weight water-soluble polymeric composition having a polymeric backbone comprised of acrylic acid or an alkali-metal salt thereof, to which is grafted an ionene type polymer prepared by reacting a dihalo organic compound having the formula:

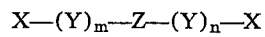

$$X-(Y)_m-Z-(Y)_n-X$$

wherein X represents Br or Cl; each Y independently represents a $CH_2$ group or a substituted $CH_2$ group wherein one of the hydrogens thereof is replaced by alkyl or hydroxymethyl characterized in that the total number of substituted $CH_2$ groups of each Y may not exceed 3, and

*m* and *n* independently represent integers varying from 1 to 10, Z represents

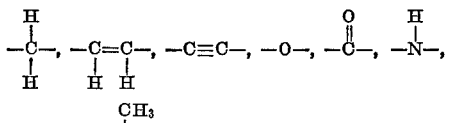

—OCH$_2$CH$_2$O—, —OCH—CH$_2$O—, —OCH$_2$O—, —S—, —SO—, —SO$_2$—
            |
            CH$_3$ and arylene, with a secondary or a ditertiary amine producing an intermediate polymeric composition containing 1 to 2 tertiary amine end groups and then reacting said intermediate polymeric composition with a bifunctional coupling agent selected from epichlorohydrin, epibromohydrin, 1-chloro-2,3-epithiopropane, 1,4-dichloro-2-butene, 1,3 - dichloro-2-propanol, dichloroethyl ether, ethylene dichloride or ethylene dibromide.

2. The composition of claim 1 wherein the polymeric backbone is comprised of acrylic acid.

3. The composition of claim 1 wherein the polymeric backbone is comprised of an alkali-metal salt of acrylic acid.

4. The composition of claim 1 wherein the polymeric backbone is comprised of methacrylic acid.

5. The composition of claim 1 wherein the polymeric backbone is comprised of an alkali-metal salt of methacrylic acid.

6. The composition of claim 1 wherein the polymeric backbone is a copolymer of acrylic acid and acrylamide.

7. The composition of claim 1 wherein the polymeric backbone is a copolymer of an alkali-metal salt of acrylic acid and acrylamide.

8. The composition of claim 1 wherein the polymeric backbone is a copolymer of methacrylic acid and acrylamide.

9. The composition of claim 1 wherein the polymeric backbone is a copolymer of an alkali-metal salt of methacrylic acid and acrylamide.

10. The composition of claim 1 wherein the coupling agent is epichlorohydrin.

11. The composition of claim 1 wherein the coupling agent is 1,4-dichloro-2-butene.

12. The composition of claim 1 wherein the coupling agent is dichloroethyl ether.

13. The composition of claim 1 wherein the coupling agent is ethylene dibromide.

14. The composition of claim 1 wherein the coupling agent is ethylene dichloride.

15. The composition of claim 1 wherein the ionene type polymer is formed by reacting dichloroethyl ether with N,N,N',N'-tetramethylethylenediamine.

16. The composition of claim 1 wherein the ionene type polymer is formed by reacting dichloroethyl ether with N,N'-dimethylpiperazine.

17. The composition of claim 1 wherein the ionene type polymer is formed by reacting 1,4-dichlorobutane with N,N,N',N'-tetramethylhexanediamine.

18. A method of preparing a high molecular weight water-soluble ionene polymeric composition which comprises reacting a dihalo organic compound having the formula:

$$X-(Y)_m-Z-(Y)_n-X$$

wherein X represents Br or Cl; each Y independently represents a CH$_2$ group or a substituted CH$_2$ group wherein one of the hydrogens thereof is replaced by alkyl or hydroxymethyl characterized in that the total number of substituted CH$_2$ groups of each Y may not exceed 3, and *m* and *n* independently represent integers varying from 1 to 10, Z represents

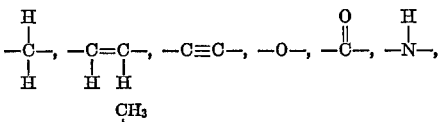

—OCH$_2$CH$_2$O—, —OCH—CH$_2$O—, —OCH$_2$O—, —S—, —SO—, —SO$_2$—
            |
            CH$_3$ and arylene, with a secondary or a ditertiary amine producing an intermediate polymeric composition containing 1 or 2 tertiary amine end groups and then reacting said intermediate polymeric composition with a bifunctional coupling agent selected from epichlorohydrin, epibromohydrin, 1 - chloro - 2,3 - epithiopropane, 1,4-dichloro-2-butene, 1,3-dichloro - 2 - propanol, dichloroethyl ether, ethylene dichloride or ethylene dibromide and then reacting this intermediate with a polymeric backbone comprised of acrylic acid or an alkali-metal salt thereof.

19. The method of claim 18 wherein the polymeric backbone is comprised of acrylic acid.

20. The method of claim 18 wherein the polymeric backbone is comprised of an alkali-metal salt of acrylic acid.

21. The method of claim 18 wherein the polymeric backbone is comprised of methacrylic acid.

22. The method of claim 18 wherein the polymeric backbone is comprised of an alkali-metal salt of methacrylic acid.

23. The method of claim 18 wherein the polymeric backbone is a copolymer of acrylic acid and acrylamide.

24. The method of claim 18 wherein the polymeric backbone is a copolymer of an alkali-metal salt of acrylic acid and acrylamide.

25. The method of claim 18 wherein the polymeric backbone is a copolymer of methacrylic acid and acrylamide.

26. The method of claim 18 wherein the polymeric backbone is a copolymer of an alkali-metal salt of methacrylic acid and acrylamide.

27. The method of claim 18 wherein the coupling agent is epichlorohydrin.

28. The method of claim 18 wherein the coupling agent is 1,4-dichloro-2-butene.

29. The method of claim 18 wherein the coupling agent is dichloroethyl ether.

30. The method of claim 18 wherein the coupling agent is ethylene dibromide.

31. The method of claim 18 wherein the coupling agent is ethylene dichloride.

References Cited

UNITED STATES PATENTS

| | | | |
|---|---|---|---|
| 2,832,746 | 4/1958 | Jackson | 260—874 |
| 3,489,663 | 1/1970 | Bayer | 260—567.6 R |
| 3,629,161 | 12/1971 | Moacanin et al. | 260—874 |

MURRAY TILLMAN, Primary Examiner

J. ZEIGLER, Assistant Examiner

U.S. Cl. X.R.

71—67; 75—1; 117—139.5; 210—54; 260—2 R, EP, EN, 17, 23 CP, AP, 123; 424—81